(12) United States Patent
Cartwright

(10) Patent No.: US 6,637,945 B2
(45) Date of Patent: Oct. 28, 2003

(54) APPARATUS THAT MOUNTS A STEERING SHAFT TO A VEHICLE

(75) Inventor: Mark A. Cartwright, West Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/934,124

(22) Filed: Aug. 21, 2001

(65) Prior Publication Data

US 2003/0039424 A1 Feb. 27, 2003

(51) Int. Cl.$^7$ ............................................... F16C 43/04
(52) U.S. Cl. ........................................ 384/584; 74/493
(58) Field of Search .......................... 74/493, 531, 533; 280/775; 384/584, 521, 520, 528, 529, 516, 538

(56) References Cited

U.S. PATENT DOCUMENTS

| | | |
|---|---|---|
| 3,415,140 A | 12/1968 | Bein et al. |
| 3,578,782 A | 5/1971 | Miyoshi |
| 4,402,236 A * | 9/1983 | Nishikawa .................... 74/493 |
| 4,475,744 A * | 10/1984 | Leutz ........................... 280/775 |
| 4,481,838 A * | 11/1984 | Findley et al. ............... 280/775 |
| 4,516,440 A * | 5/1985 | Nishikawa .................... 280/775 |
| 5,606,892 A | 3/1997 | Hedderly |
| 5,802,221 A | 9/1998 | Luthi et al. |
| 5,943,916 A | 8/1999 | Baumann et al. |

* cited by examiner

Primary Examiner—Christopher P. Schwartz
Assistant Examiner—Melanie Torres
(74) Attorney, Agent, or Firm—Tarolli, Sundheim, Covell & Tummino L.L.P.

(57) ABSTRACT

An apparatus that mounts a steering shaft connectable with a steering wheel and rotatable to turn steerable vehicle wheels to a vehicle includes a support member connectable with the vehicle. The support member has first and second bearing housings spaced from each other along a longitudinal axis of the steering shaft. Each of the first and second bearing housings has a surface extending parallel to the longitudinal axis with an opening through which bearings are inserted that support the steering shaft for rotation relative to the support member.

13 Claims, 3 Drawing Sheets

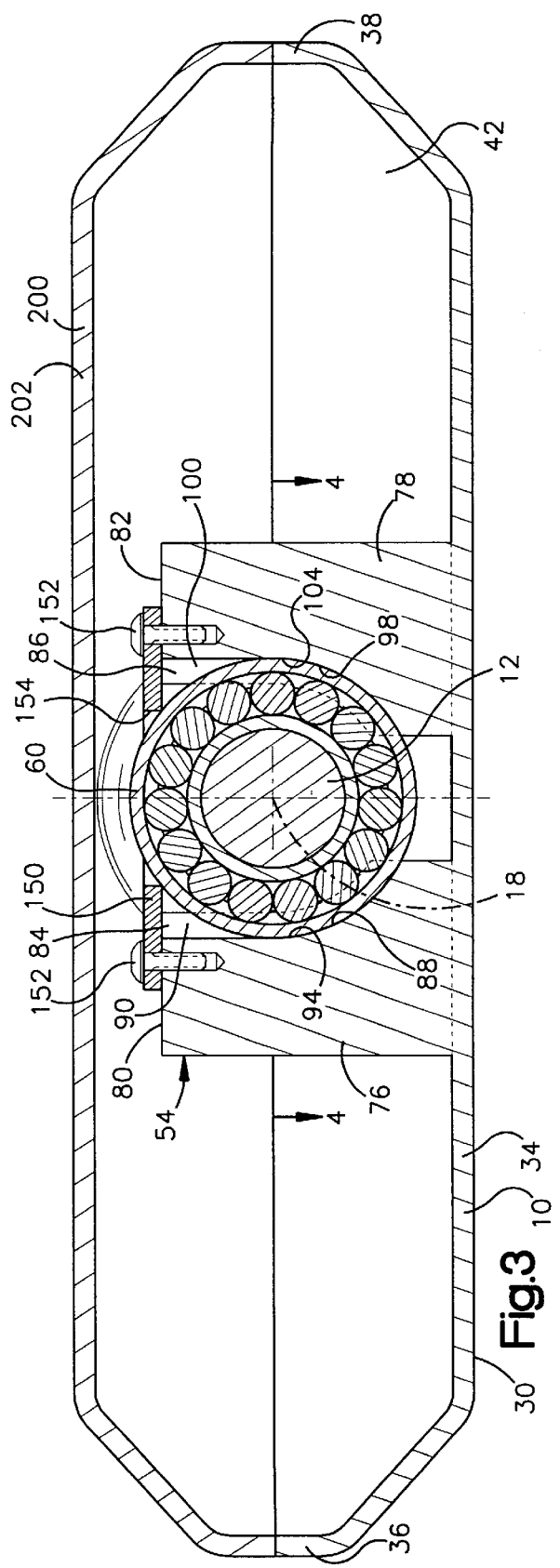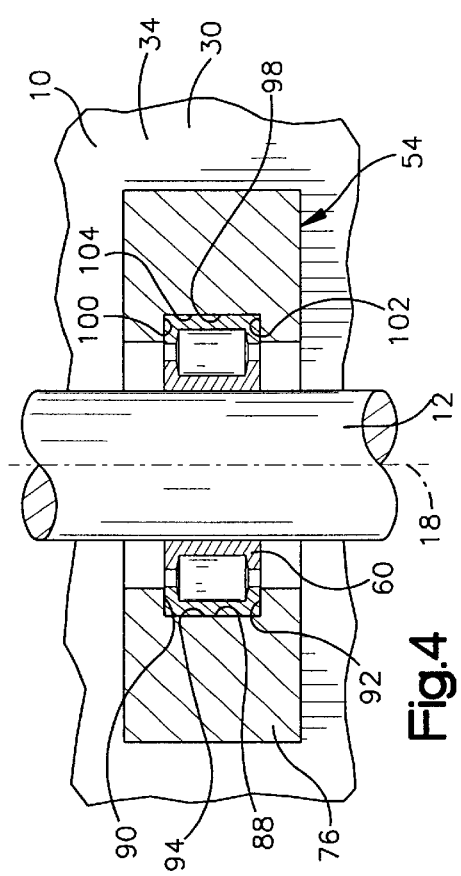

APPARATUS THAT MOUNTS A STEERING SHAFT TO A VEHICLE

FIELD OF THE INVENTION

The present invention relates to an apparatus that mounts a steering shaft, which is connectable with a steering wheel and rotatable to turn steerable vehicle wheels, to a vehicle.

A known apparatus that mounts a steering shaft to a vehicle includes a tubular support rotatably supporting the steering shaft for rotation about a longitudinal axis of the steering shaft. The steering shaft is connectable with a steering wheel and rotatable to turn steerable vehicle wheels. The tubular support is mounted to the vehicle by brackets.

SUMMARY OF THE INVENTION

The present invention is an apparatus that mounts a steering shaft to a vehicle. The steering shaft is connectable with a steering wheel and rotatable to turn steerable vehicle wheels. The apparatus includes a support member connectable with the vehicle. The support member has first and second bearing housings spaced from each other along a longitudinal axis of the steering shaft. Each of the first and second bearing housings has a surface extending parallel to the longitudinal axis with an opening through which bearings are inserted that support the steering shaft for rotation relative to the support member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is an enlarged sectional view of the apparatus taken along the line 3—3 in FIG. 2; and FIG. 4 is a sectional view taken along the line 4—4 in FIG. 3.

DESCRIPTION OF THE INVENTION

Figure 1:
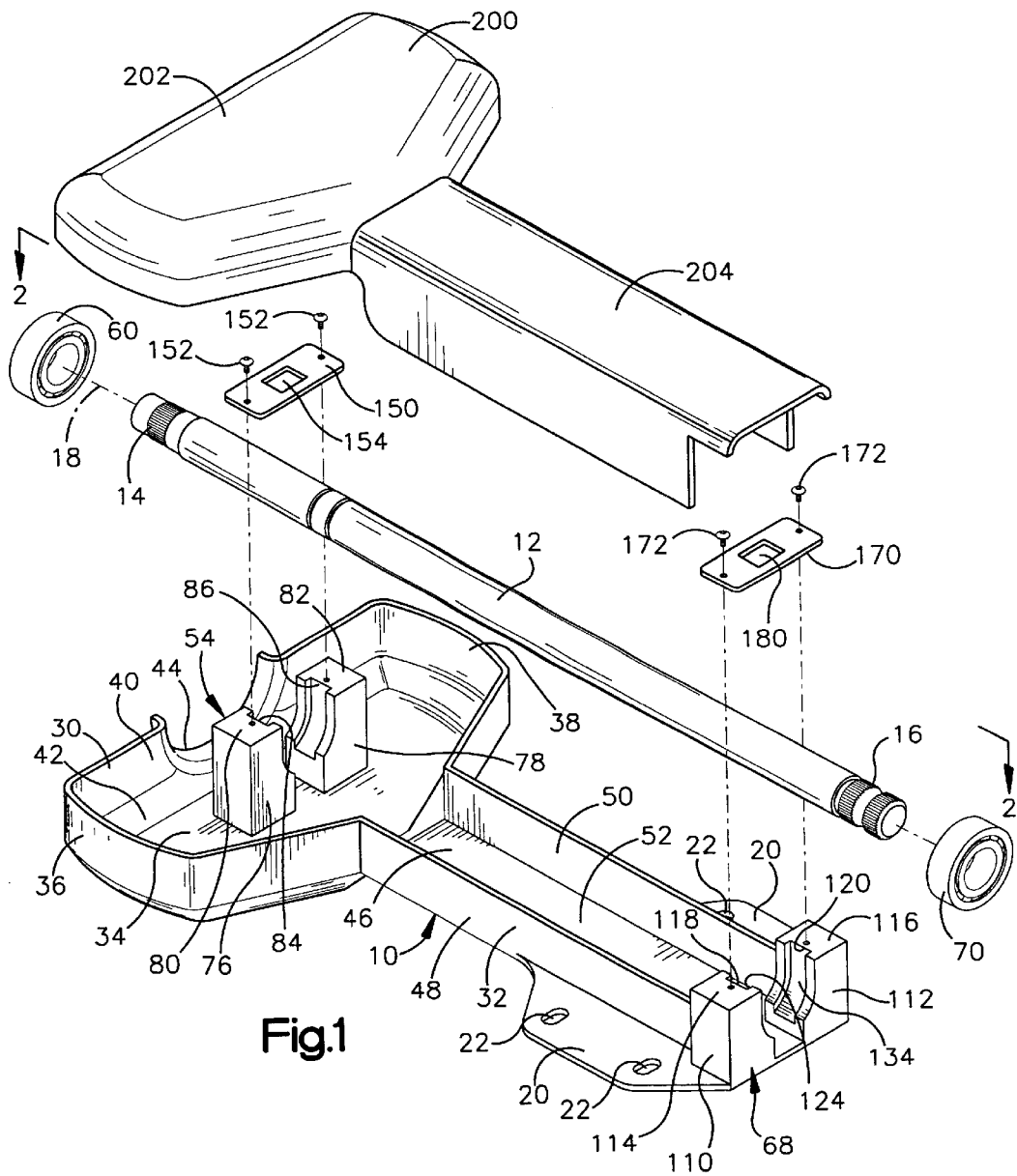
FIG. 1 is an exploded view of an apparatus constructed in accordance with the present invention.

A support member 10 (FIG. 1) mounts a steering shaft 12 to a vehicle (not shown). The steering shaft 12 has a first axial end 14 connectable with a steering wheel (not shown) in a manner known in the art. The steering shaft 12 has a second axial end 16 connectable with steerable vehicle wheels (not shown) in a manner known in the art. The steering shaft 12 is rotatable about a longitudinal axis 18 to turn the steerable vehicle wheels.

Figure 2:
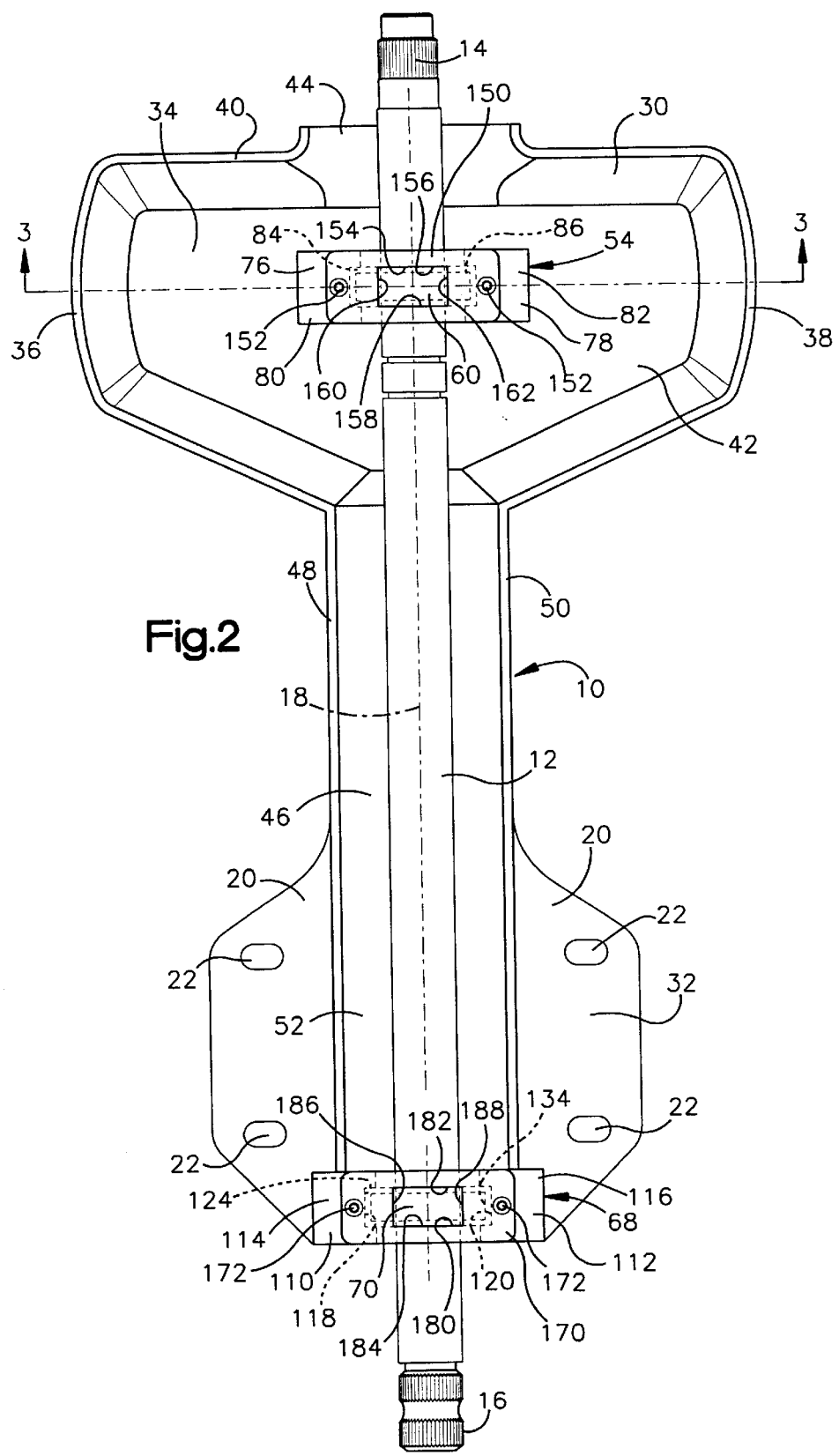
FIG. 2 is a plan view of the apparatus of FIG. 1 with parts removed for clarity.

The support member 10 is made by die casting and has radially extending flanges 20 (FIG. 2) with elongate fastener slots 22. The elongate slots 22 extend in directions transverse to the longitudinal axis 18 of the steering haft 12. The elongate slots 22 receive fasteners (not shown) for connecting the support member 10 to the vehicle. The slots 22 allow the support member 10 to be connected to the vehicle in a plurality of positions.

The support member 10 (FIGS. 1 and 2) has an upper axial end portion 30 and a lower axial end portion 32 extending from the upper axial end portion. The upper axial end portion 30 has a back wall 34 and first and second side walls 36 and 38 extending from the back wall 34 and generally parallel to the longitudinal axis 18. An upper axial end wall 40 of the end portion 30 extends from the back wall 34 and between the first and second side walls 36 and 38. The back wall 34, side walls 36 and 38 and the end wall 40 define a radially extending cavity 42. The end wall 40 has an opening 44 through which the steering shaft 12 extends.

The lower axial end portion 32 of the support member 10 has a back wall 46 and first and second side walls 48 and 50. The side walls 48 and 50 extend from the back wall 46 and generally parallel to the longitudinal axis 18. The back wall 46 and side walls 48 and 50 define a channel 52 through which the steering shaft 12 extends.

A bearing housing 54 (FIGS. 1 and 2) extends from the back wall 34 of the end portion 30 into the cavity 42. The bearing housing 54 receives a bearing 60 (FIG. 1) that rotatably supports the steering shaft 12 for rotation relative to the support member 10. A bearing housing 68 extends from the back wall 46 of the axial end portion 32. The bearing housing 68 receives a bearing 70 that rotatably supports the steering shaft 12 for rotation relative to the support member 10.

The bearing housings 54 and 68 are substantially identical and, therefore, only bearing housing 54 will be described in detail. The bearing housing 54 (FIGS. 3 and 4) includes first and second portions 76 and 78 extending from the wall 34 of the support member 10. The portions 76 and 78 of the bearing housing 54 extend from the wall 34 and are spaced from each other on opposite sides of the axis 18. The portion 76 (FIGS. 1 and 3) has an outer surface 80 extending parallel to the longitudinal axis 18. The portion 78 has an outer surface 82 extending parallel to the longitudinal axis 18. The surface 80 has an opening 84 through which the bearing 60 is inserted. The surface 82 of the portion 78 has an opening 86 through which the bearing 60 is inserted.

The portion 76 (FIG. 4) has a part cylindrical recess 88 which receives the bearing 60. The recess 88 is defined by an axially upper surface 90 and an axially lower surface 92 extending generally parallel to the upper surface. The upper and lower surfaces 90 and 92 extend perpendicular to the surface 80. A part cylindrical wall 94 (FIGS. 3 and 4) extends between the upper and lower surfaces 90 and 92 and generally perpendicular to the upper and lower surfaces. The upper and lower surfaces 90 and 92 and the part cylindrical wall 94 engage the bearing 60 to retain the bearing in the recess 88.

The portion 78 (FIG. 4) has a part cylindrical recess 98 which receives the bearing 60. The recess 98 is defined by an axially upper surface 100 and an axially lower surface 102 extending generally parallel to the upper surface. The upper and lower surfaces 100 and 102 extend perpendicular to the surface 82. A part cylindrical wall 104 extends between the upper and lower surfaces 100 and 102 and generally perpendicular to the upper and lower surfaces. The upper and lower surfaces 100 and 102 and the part cylindrical wall 104 engage the bearing 60 to retain the bearing in the recess 98.

The bearing housing 68 is generally similar to the bearing housing 54 and will not be described in detail. The bearing housing 68 (FIGS. 1 and 2) includes portions 110 and 112 extending from the wall 46. The portions 110 and 112 of the bearing housing 68 extend from the wall 46 and are spaced from each other on opposite sides of the axis 18. The portion 110 has an outer surface 114 extending parallel to the longitudinal axis 18. The portion 112 has an outer surface 116 extending parallel to the longitudinal axis 18. The surface 114 has an opening 118 through which the bearing 70 is inserted. The surface 116 of the portion 112 has an opening 120 through which the bearing 70 is inserted.

The portion 110 has a part cylindrical recess 124 which receives the bearing 70. The recess 124 is defined by axially upper and lower surfaces extending generally parallel to each other. The upper and lower surfaces extend perpendicular to the surface 114. A part cylindrical wall extends between the upper and lower surfaces and generally perpendicular to the upper and lower surfaces. The upper and lower surfaces and the part cylindrical wall engage the bearing 70 to retain the bearing in the recess 124.

The portion 112 has a part cylindrical recess 134 which receives the bearing 70. The recess 134 is defined by axially upper and lower surfaces extending generally parallel to each other. The upper and lower surfaces extend perpendicular to the surface 116. A part cylindrical wall extends between the upper and lower surfaces and generally perpendicular to the upper and lower surfaces. The upper and lower surfaces and the part cylindrical wall engage the bearing 70 to retain the bearing in the recess 134.

A bearing cover 150 (FIGS. 1 and 2) is connected to the portions 76 and 78 of the bearing housing 54 to cover the openings 84 and 86 in the bearing housing 54. The bearing cover 150 is connected to the portions 76 and 78 by fasteners, such as screws 152. The bearing cover 150 (FIG. 2) has an opening 154 defined by an axially upper surface 156 and an axially lower surface 158 extending generally parallel to the upper surface 156. Surfaces 160 and 162 extend generally perpendicular to the surfaces 156 and 158 and parallel to the axis 18. The bearing 60 extends through the opening 154, see FIG. 3, and engages the surfaces 156, 158, 160, and 162.

A bearing cover 170 (FIGS. 1 and 2) is connected to the portions 110 and 112 of the bearing housing 68 to cover the openings 118 and 120 in the bearing housing. The bearing cover 170 is connected to the bearing housing 68 by fasteners, such as screws 172. The bearing cover 170 (FIG. 2) has an opening 180 defined by an axially upper surface 182 and an axially lower surface 184 extending generally parallel to the upper surface 182. Surfaces 186 and 188 extend generally perpendicular to the surfaces 182 and 184 and parallel to the axis 18. The bearing 70 extends through the opening 180 and engages the surfaces 182, 184, 186, and 188.

A decorative cover 200 (FIG. 1) is connected with the support member 10 in a manner known in the art. The cover 200 may be connected to the support member 10 by riveting, self-tapping screws, or by plastic screws. The cover 200 has an axial end portion 202 engageable with the axial end portion 30 of the support member 10. The axial end portion 202 of the cover 200 and the axial end portion 30 of the support member 10 (FIG. 3) define the radially extending cavity 42 through which the steering shaft 12 extends. An axial end portion 204 of the cover 200 engages the axial end portion 32 of the support member 10. Accordingly, the support member 10 and the cover 200 surround the steering shaft 12.

The support member 10 easily mounts the shaft 12 to the vehicle. The support member 10 is connected to the vehicle by fasteners extending through the slots 22. The shaft 12 is then connected with the support member 10 by inserting the bearings 60 and 70 into the bearing housings 54 and 68. The bearing covers 150 and 170 are connected to the bearing housings 54 and 68 to connect the shaft 12 to the support member 10.

From the above description of the invention, those skilled in the art will perceive improvements, changes and modifications. Such improvements, changes and modifications within the skill of the art are intended to be covered by the appended claims.

Having described the invention, the following is claimed:

1. An apparatus that mounts a steering shaft to a vehicle, the steering shaft being connectable with a steering wheel and rotatable to turn steerable vehicle wheels, said apparatus comprising a support member connectable with the vehicle, said support member having first and second bearing housings spaced from each other along a longitudinal axis of the steering shaft, each of said first and second bearing housings having an outer surface extending parallel to the longitudinal axis with an opening through which bearings that support the steering shaft for rotation relative to said support member are inserted radially of the longitudinal axis.

2. An apparatus as defined in claim 1 wherein said first and second bearing housings have recesses defined by upper and lower surfaces extending perpendicular to said outer surfaces, said upper and lower surfaces being engageable with the bearings.

3. An apparatus as defined in claim 1 further including first and second bearing covers, said first and second bearing covers being connectable to said first and second bearing housings to at least partially cover said openings and retain the bearings in said first and second bearing housings.

4. An apparatus as defined in claim 3 wherein said first and second bearing covers have surfaces defining openings through which the bearings extend, said surfaces defining said openings being engageable with the bearings.

5. An apparatus as defined in claim 1 wherein said support member has a first axial end at least partially defining a radially extending cavity through which the steering shaft is extendable and a second axial end extending from said first axial end.

6. An apparatus as defined in claim 5 wherein at least one of said first and second bearing housings extends from a wall of said first axial end portion into said cavity.

7. An apparatus as defined in claim 5 wherein said support member has an axial end wall at least partially defining said cavity in said support member, said axial end wall having an opening through which the steering shaft is extendable.

8. An apparatus as defined in claim 1 wherein said support member includes fastener openings for receiving fasteners that connect said support member with the vehicle.

9. An apparatus as defined in claim 8 wherein said fastener openings in said support member are elongate slots.

10. An apparatus as defined in claim 1 further including a cover connectable with said support member, said support member and said cover having axial end portions defining a radially extending cavity surrounding the steering shaft when the steering shaft is connected with said support member.

11. An apparatus as defined in claim 10 wherein at least one of said first and second bearing housings extends from said axial end portion of said support member into said cavity.

12. An apparatus that mounts a steering shaft to a vehicle, the steering shaft being connectable with a steering wheel and rotatable to turn steerable vehicle wheels, said apparatus comprising a support member connectable with the vehicle, said support member having first and second bearing housings spaced from each other along a longitudinal axis of the steering shaft, each of said first and second bearing housings having an outer surface extending parallel to the longitudinal axis with an opening through which bearings are inserted that support the steering shaft for rotation relative to said support member, said first and second bearing housings including first and second portions extending from a wall of said support member and spaced from each other on opposite sides of the longitudinal axis, said first and second portions defining said openings through which the bearings are inserted.

13. An apparatus as defined in claim 12 wherein said first and second portions include recesses defined by upper and lower surfaces extending perpendicular to said outer surfaces, said upper and lower surfaces being engageable with the bearings.

* * * * *